Dec. 5, 1933.  J. F. THOMAS ET AL  1,938,407
AUTOMATIC COUPLER
Filed July 22, 1931   2 Sheets-Sheet 1

Inventors:
James F. Thomas
Frank G. Ricker
By Williams, Bradbury,
McCaleb & Hinkle, Attys.

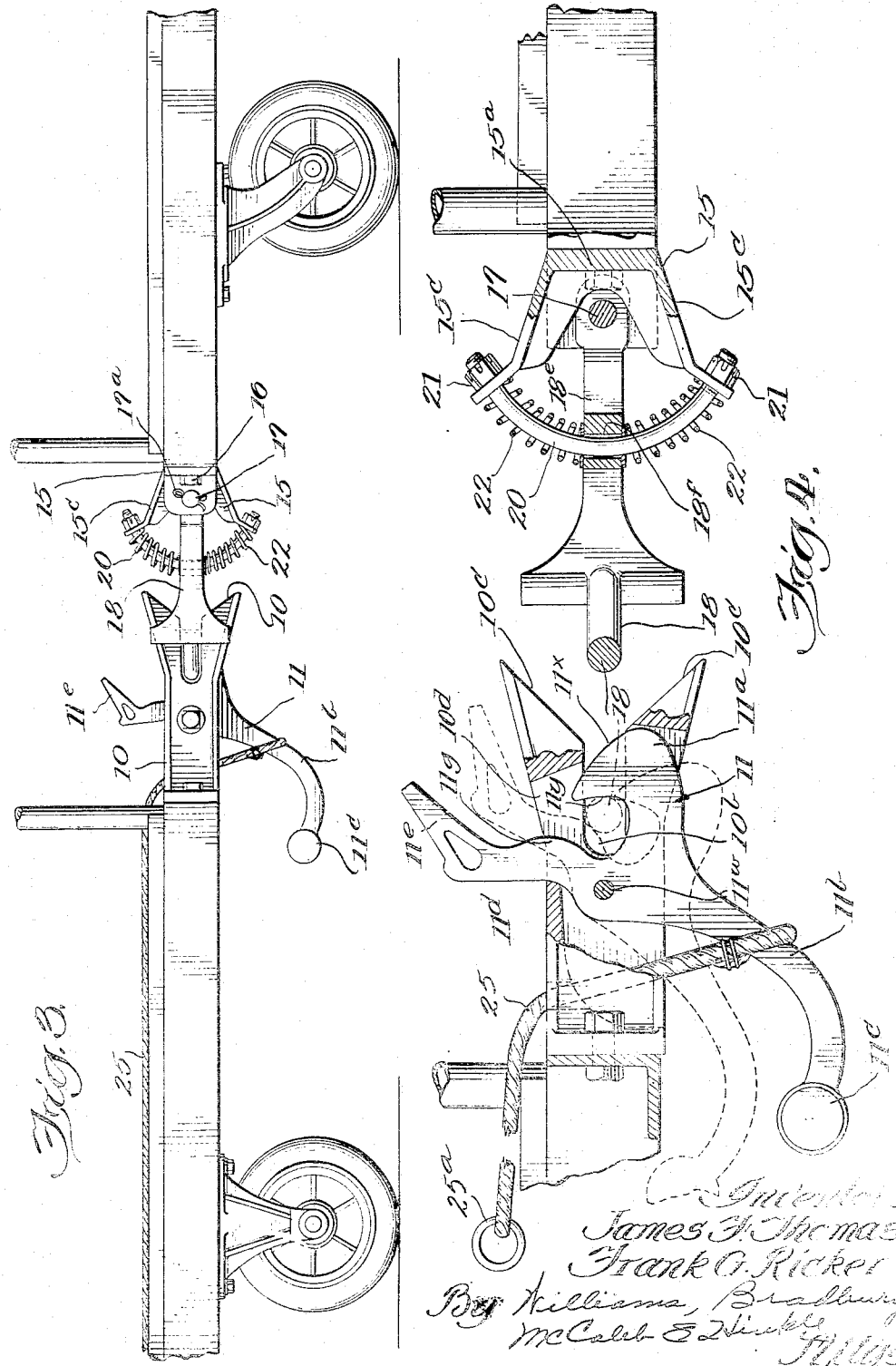

Patented Dec. 5, 1933

1,938,407

UNITED STATES PATENT OFFICE 1,938,407

AUTOMATIC COUPLER

James F. Thomas and Frank G. Ricker, Faribault, Minn., assignors to Nutting Truck Company, Faribault, Minn., a corporation of Minnesota Application July 22, 1931. Serial No. 552,310

12 Claims. (Cl. 280—33.15)

This invention relates to automatic couplers, and has for an object the provision of a device of that character, particularly adapted for use with tractor-trailer truck combinations, which will make the coupling operation simple and automatic, save for the imparting of movement to the tractor or the trailer.

Another object consists in the provision of means for the ready and easy release of the coupler.

Another object consists in the provision of means yieldingly to hold the bail of the mechanism in substantially the plane of the platform of the vehicle to which it is applied.

Other objects reside in the details and combinations thereof as will be more fully set forth and described in the following specification and shown in the accompanying drawings, in which Fig. 1 is a perspective view of two coupled trucks utilizing our invention;

Fig. 3 is a side elevation of the structure illustrated in Fig. 2; and

Fig. 4 is a vertical section of the coupling mechanism drawn to enlarged scale.

Like numerals refer to like elements throughout the drawings.

Figure 1:
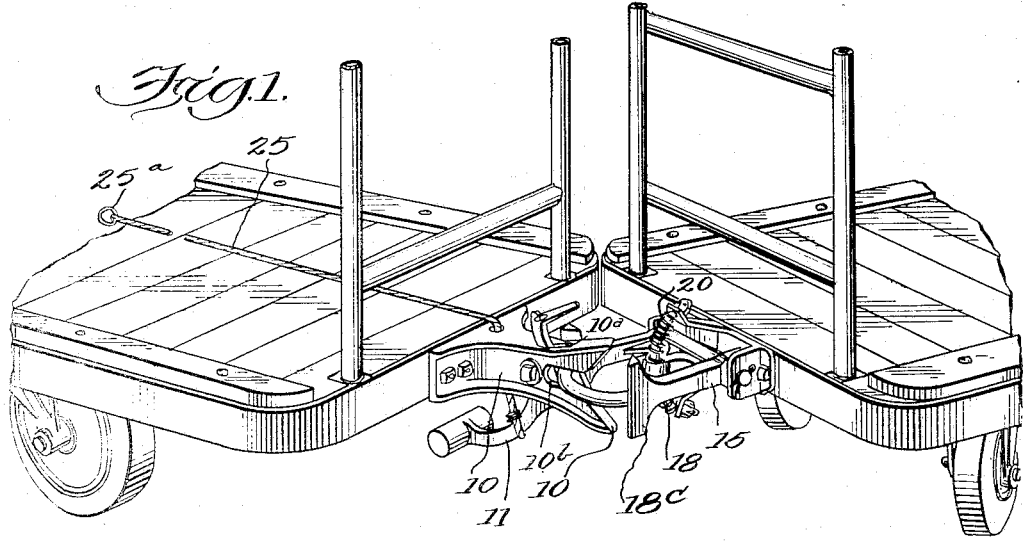

10 indicates generally a drawbar head having the laterally extended base portion 10a secured by bolts, lag screws, welding, or the like, to one end of a trailer or tractor. The drawbar head is narrowed forwardly on the base portion 10a and provided with a horizontal slot 10b open at the entrance end for accommodation of the bail of the coacting unit described below. The drawbar head is provided with a concave recess 10c at its outer end and its height is increased at that point to provide an enlarged entrance, the top and bottom of which converge toward the entrance of the slot 10b, as illustrated in Fig. 4. A vertical slot or recess 10d extends through the drawbar head from top to bottom intermediate its extremities to form a species of chamber which is extended forwardly to accommodate a hook member 11 pivotally mounted therein and having a forwardly projecting hook portion 11a, the downwardly extending and rearwardly curved arm 11b terminating in a weight 11c, and additionally having an upwardly projecting arm 11d which terminates in a laterally disposed pedal portion 11e located above the drawbar head. At its upper portion the rear wall of the slot 10d is constructed to act as a limiting stop for the pedal arm 11d to limit the upward movement of the pedal and thereby of the hook 11a. The arm 11b and its weight 11c are arranged to overbalance the remainder of the hook member 11 and normally to maintain the same in its uppermost position with the pedal arm against the rear wall of the slot 10d, as illustrated in Fig. 4.

Figure 2:
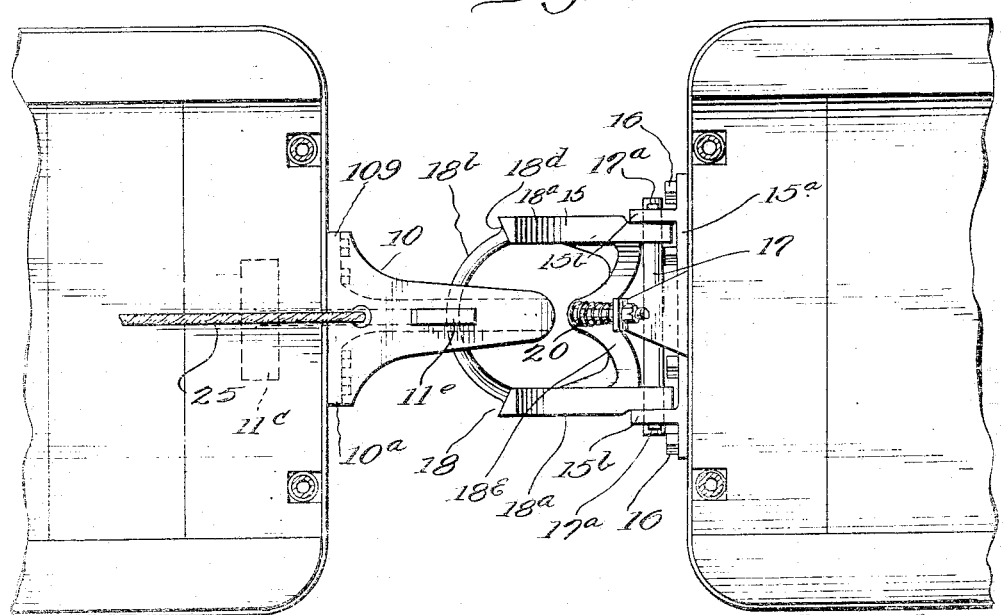
Fig. 2 is a plan view of the same, showing the trucks in aligned position.

The complementary unit of my improved coupler comprises a bracket 15, having a base plate portion 15a secured by bolts, welding, or the like, 16 to one end of a truck or similar vehicle. Projecting outwardly from the base 15a is a pair of spaced flanges 15b between which extends and in which is secured a hinge pin 17 maintained in position by cotter pins 17a, or the like. Pivotally mounted upon or secured to the pin 17 to rotate therewith as may be desired, is a bail member 18, having parallel sides 18a, the ends of which are mounted upon the pin 17, as illustrated in Figs. 2 and 4, for example. At its outer or forward portion the bail 18 is provided with a curved portion 18b, the side arms 18a at the juncture with 18b being expanded to form wings designated by numeral 18c (see Fig. 1). These wings 18c are inclined inwardly and rearwardly, as indicated by numeral 18d for a purpose hereinafter described.

Extending across, between and formed integral with the arms 18a in the embodiment shown, is a cross arm 18e. The arm 18e is formed with a pair of arcuate portions projecting upwardly to a central junction point in which is provided an aperture 18f.

Projecting forwardly and diverging from the top and bottom of the bracket 15, are the upper and lower flanges 15c between which extends an arcuate rod 20 secured in assembled relation by the nuts 21 engaging threaded extremities of this rod 20 and concentric with the bail 18. Preferably the outer ends of the flanges 15c are angularly formed to present a surface which is normal to the respective ends of the rod 20, as illustrated in Fig. 4, for example.

Between each of the flanges 15c and the cross arm 18e is mounted a coiled spring 22 surrounding the rod 20.

In the arrangement last described, the bail member 18 will be normally held in alignment with the plane of the vehicle platform generally in horizontal position, wherein it is best arranged for entrance into the recess 10c and subsequently into the slot 10b during coupling operation. After coupling, the springs 22, while yieldingly resisting movement of the bail from normal position, will nevertheless permit such movement as is necessary to accommodate relative vertical movement between tractor and trailer.

The front of the hook portion 11a is inclined rearwardly as viewed in Fig. 4, for example, as indicated by numeral 11x and at its inner wall is curved at 11y on an arc substantially concentric with the pivotal point of the hook member 11. The outer front wall 11x is preferably curved or inclined on an arc such that the bail 18 will force or cam the same downwardly to uncoupled position until the bail has passed.

The portion 11g of the arm 11d opposed to the hook member 11a is preferably bulged or constructed as illustrated in Fig. 4, for the purpose hereinafter described.

In operation, assuming that the two vehicles are to be coupled, one or both are moved to coupling position. The bail enters the slot 10b and, as stated, encountering the inclined wall 11x of the hook portion will force the hook downwardly against the resistance of the weighted arm 11b until the bail rides over into the hook recess, whereupon it will contact with the bulged portion 11g of the arm 11d and in coaction with the weighted arm will swing the hook back to coupling position. Care must be taken to arrange the inclined surface 11x and the surrounding walls of the recess at such an angle that the camming action of the bail upon the inclined surface 11x, while held against vertical movement by the top of the slot 10b will insure this movement of the hook member 11 to open position, without wedging of the bail and hook.

Should one vehicle be on a higher or lower supporting surface, the bail during coupling movement will encounter an inclined wall of the recess 10c and be directed to the slot 10b, the corresponding spring 22 yielding to permit this movement. This best provides for relative displacement vertically of one vehicle with respect to the other and insures that the bail will always be in the same position with respect to the platform of the vehicle to which it is applied.

The wings 18c will function to guide the drawbar head into coupling position if it should be out of proper position when one vehicle is offset or angularly positioned with respect to the other. At the same time the construction is such as to permit full relative angular movement of one vehicle with respect to the other as illustrated in Fig. 1 without interference from the wings 18c.

When it is desired to uncouple the two vehicles, it is merely necessary for the operator to depress the pedal 11e with his foot or hand to release the bail from the hook 10b, which is possible even though tractive force is being exerted upon the bail, since the curved wall 11y is substantially formed about the pivotal point of the hook as a center.

Should the vehicles be under draft when the pedal 11e is depressed after the hook 11a has passed below the center of the bail 18, the bulged portion 11g of arm 11d will contact with the bail 18 and force the same rearwardly over the hook 11a so that if the pedal 11e be released, even though there be no additional movement of the trucks, the bail will lie in such position as to prevent the return of the hook 11a to coupling position under the influence of the weight 11c, thereby relieving the operator from the necessity of maintaining the pedal depressed until the vehicles are moved by tractor, or otherwise, into spaced relation.

After the release of the pedal 11e the weighted arm 11b will return the hook member to engaging position, as illustrated in Fig. 4.

We find it desirable in some installations to attach a cord or cable 25 or the like to the weighted arm 11b, such cord being passed upwardly through a hole provided in the draw bar head and equipped with a ring 25a at the other end. This cord may be led to any desirable location, as, for example, on the tractor unit to a position adjacent the operator, who, by pulling upon the cord, may move the coupler to or toward uncoupling position without leaving the seat of the vehicle.

Where we have referred to truck and trailer, it is to be understood that these terms are relative and our invention is equally applicable to adjacent trucks of a train when transmitting as well as receiving tractive effort.

It will be apparent that our invention is susceptible of modification and of departure from the specific embodiment illustrated, and we do not wish to be restricted to such form except as proper interpretation of the claims renders such restriction necessary.

What we claim is:

1. In combination, a drawbar head, a hook member pivotally carried thereby, a bail engageable with said hook member, said bail being pivotally mounted, a cross bar associated with said bail, a spring at each side of said cross bar and coacting therewith yieldingly to resist movement of said hook member from one position in either direction, and to return the same to said position when released from engagement with said hook member.

2. In combination, a drawbar head, a hook member pivotally carried thereby, a pivotally mounted bail, said bail being provided with a cross bar, an arcuate rod, said bar being apertured to accommodate said rod, and springs located one at each side of said cross bar to resist movement thereof in either direction from a normal position.

3. In combination, a drawbar head, a hook member pivotally carried thereby, a bail engageable with said hook member, a bracket attachable to a truck and pivotally supporting said bail, and means supported by extended portions of said bracket yieldingly to hold said bail member in a definite normal position relative to said hook, said means comprising a pair of opposed springs coacting with said bail.

4. In combination, a drawbar head, a hook member pivotally carried thereby, a pivotally mounted bail, said bail being provided with a cross bar, an arcuate rod, said bar being apertured to accommodate said rod, springs located one at each side of said cross bar to resist movement thereof in either direction from a normal position, flanges, said rod extending between and carried by said flanges.

5. In combination, a drawbar head, a hook member pivotally carried thereby, a pivotally mounted bail, said bail being provided with a cross bar, an arcuate rod, said bar being apertured to accommodate said rod, springs located one at each side of said cross bar to resist movement thereof in either direction from a normal position, flanges, said rod extending between and carried by said flanges, said hook member being provided with a projecting portion actuatable to move said hook portion from position across said slot.

6. In combination, a drawbar head, a hook member pivotally mounted on said head and having a hook portion movable to and from coupling position, an arm projecting outwardly from said hook member and weighted normally to maintain said hook portion in coupling position, and an actuatable portion comprising an arm projecting outwardly and upwardly from said recess and having an offset arm providing a combination pedal and handle portion, and operable to move said hook portions out of said position by depressing said pedal portion.

7. In combination, a drawbar head, a pivoted hook member associated therewith, said drawbar head being provided with an open ended slot and an entrance recess leading thereto, a bail pivoted in a bracket and movable into and out of said entrance and slot for engagement with or disengagement from said hook member, and means yieldingly to resist pivotal movement of said bail member and to maintain the same normally in one position for entrance into said slot, said bail member being provided with wing stop portions at the outer sides thereof, said yielding means comprising arms divergent from said bracket and supporting a guide rod carrying opposed spring means effective to limit the movement of said bail.

8. An improved coupling device comprising, in combination, a bracket attachable to a truck, or the like, a bail member pivotally attached thereto, said bracket being formed with arms over- and underlying said bail, an arcuate rod extending between and carried by said arms, and springs interposed between said arms and said bail yieldingly to resist movement thereof from a normal position.

9. In combination, a bracket attachable to a truck, said bracket being formed with spaced flanges, a hinge pin extending between and carried by said flanges, a bail having spaced arms mounted on said pin for pivotal movement relative to said bracket, said bracket being further formed with over- and underlying flanges or wings, and springs mounted between said last named flanges and said bail arranged yieldingly to resist movement thereof from a normal position.

10. In combination, a bail, a drawbar head, a hook member pivotally carried thereby and having a bail engaging hook portion, the wall of said hook portion being curved concentric with the axis of pivotal movement of said hook member, the latter being provided with an integral extension having an offset arm forming a combination pedal and handle member, said extension having a bulged portion opposed to and spaced from said hook portion and operable during uncoupling movement of said hook member to contact and force said bail out of coupled position.

11. In automatic couplers, a coupling member comprising generally co-extensive arms, one of which is provided with counter-balancing means, and the other of which is provided with an offset portion comprising a pedal member, and a coupling hook situated substantially between said arms, the hooking portion thereof confronting the pedal extension, said pedal extension having a bulged portion confronting said hooking portion and adapted to force a coupling bail out of engagement therewith.

12. In combination, a drawbar head, a coupling member pivotally carried thereby and having substantially co-extensive arms, each having an offset portion, one of said portions being provided with counter-balancing means, and the other said portion being shaped to provide a combination pedal and handle member, said coupling member having a hook portion situated substantially between said co-extensive arms, said hook portion being provided with a bail-engaging surface concentric with the axis of pivotal movement of said coupling member and substantially confronting the pedal arm of said co-extensive arms, said pedal arm having a raised portion confronting said hook portion and constructed and arranged to contact a bail engaged by said hook portion during uncoupling movement of said hook member positively to force said bail out of coupled position.

JAMES F. THOMAS.
FRANK G. RICKER.